United States Patent Office 3,448,010
Patented June 3, 1969

3,448,010
PREPARATION OF ACTIVE DRY YEAST
Seymour Pomper, Stamford, Conn., and Emanuel Akerman, Bronx, N.Y., assignors to Standard Brands Incorporated, New York, N.Y., a corporation of Delaware
No Drawing. Filed Feb. 18, 1965, Ser. No. 433,793
Int. Cl. C12c *11/30;* C12k *3/00*
U.S. Cl. 195—74                                16 Claims

ABSTRACT OF THE DISCLOSURE

An active dry yeast having a high degree of storage stability may be produced by mixing a wet yeast cake and an antioxidant selected from the group consisting of butylated hydroxyanisole and butylated hydroxytoluene and drying the mixture to a low moisture content.

---

This invention relates to a novel method of producing an active dry yeast with a high degree of storage stability.

It is known that yeast can be dehydrated to a moisture content below 8 percent by weight to produce a product which has a relatively high degree of activity. However, such a yeast product gradually loses activity on storage in air. This loss of activity can be largely reduced by packaging the yeast in containers from which the air has been evacuated or replaced by nitrogen or another inert gas. Such packaging has obvious disadvantages.

To overcome these disadvantages and enable the packaging of active dry yeast in containers containing air, Patent 3,041,249 proposes to incorporate one or more of the antioxidants, butylated hydroxyanisole (BHA), butylated hydroxyltoluene (BHT), and propyl gallate (PG) in the yeast. According to the teaching of this patent, a solution of the antioxidant in a non-toxic vehicle must be emulsified first in a large quantity of water and the emulsion then added to an aqueous suspension of the yeast cells. Moisture is removed from the mixture to provide a wet yeast cake, and the cake is extruded in the form of strands which are dried in the conventional manner to provide active dry yeast having a moisture content up to about 6%.

It has been found that the antioxidants need not be in emulsion form and need not be incorporated in an aqueous suspension of the yeast cells. In accordance with the invention an equally satisfactory active dry yeast is obtained if the BHA or BHT, or both, are thoroughly mixed with a wet yeast cake, such as the so-called compressed yeast of commerce obtained when cream yeast is filtered on a vacuum filter or a filter press, the mixture is subdivided into relatively small particles and then dried in the conventional manner to a low moisture content under controlled temperature and humidity conditions to maaintain its activity. The wet yeast cake to which the antioxidant is added will contain more than about 25 percent yeast solids and usually from about 28 to 38 percent yeast solids. Compared to the process described in the patent, the present process offers advantages in that the emulsification step is omitted, addition of water is avoided and possible loss of antioxidant in the yeast suspension is avoided.

To facilitate uniform distribution in the wet yeast cake it is advantageous to add the antioxidant in the form of a solution in an edible vehicle, for instance, an oil or fat such as peanut oil, soybean oil, corn oil, cottonseed oil and hydrogenated oils or other non-toxic solvents, for example, propylene glycol. The mixing may be carried out in conventional equipment such as a ribbon mixer. Advantageously, the solution of the antioxidant may be sprayed slowly onto the yeast mass while it is being mixed.

Very small amounts of the antioxidant are sufficient, for instance, about 0.025 to about 0.5 percent based on the weight of the yeast solids. Larger amounts may be used but they do not appear to confer any additional benefit. The greatest benefit seems to be obtained with amounts between about 0.1 and about 0.2 percent.

The amount of edible vehicle employed may vary over a wide range, the only requirements being that the amount be sufficient to substantially dissolve the antioxidant and not so large as to affect the yeast detrimentally. Satisfactory active dry yeast products have been obtained, for example, with amounts of edible vehicle in the range from about 0.25 to about 2.5 percent based on the weight of the yeast solids. The preferred level is from about 0.5 to about 1.5 percent calculated on the same basis Edible surfactants may be provided in the active dry yeast product of this invention in order to further protect its activity and to permit rehydration of the product by simply mixing it with warm water. Suitable surfactants are, for instance, sorbitan monolaurate, sorbitan monopalmitate, sorbitan monostearate, sorbitan tristearate, sorbitan monooleate and sorbitan trioleate. These surfactants can be incorporated in the yeast cake or in the yeast suspension (cream yeast) from which the yeast cake is obtained. While as little as 0.25 percent of the surfactants based on the weight of the yeast solids imparts beneficial effects to active dry seat, the greatest benefits are obtained at a level between about 1 and about 2 percent. Greater amounts may safely be added but amounts above 5 percent are not recommended since no additional benefit is obtained.

When the yeast contains both the sufactant and the antioxidant good storage stability is obtained when the yeast is dried to a moisture content in the range up to about 8%. When the antioxidant is incorporated in the yeast without the surfactant it is desirable to reduce the moisture content of the yeast to about 6% or less to obtain the desired storage stability.

In order to more clearly describe the nature of the present invention, specific examples will hereinafter be described. It should be understood however, that this is done solely by way of example and is intended neither to delineate the scope of the invention nor limit the ambit of the appended claims. In the example and throughout the specification, percentages are intended to refer to percent by weight unless otherwise specified.

EXAMPLE I

This example illustrates the use of BHA in the method of the present invention. Comparable results were obtained with BHT.

1.47 grams of a solution of BHA in an edible vehicle (1 part by weight of BHA to 7 parts of peanut oil) were gradually sprayed onto 600 grams of compressed yeast containing 30.7% yeast solids over a period of about 5 minutes while the yeast was being mixed in a Kitchen Aid mixer. This treated yeast was extruded into spaghetti form and dried in air maintained at a temperature in the range from 95° to 120° F. and at a relative humidity from about 10% to about 70% over a period of about 7 hours to obtain an active dry yeast product containing 5.4% the same temperature after being punched down (proof well as after storage in an oxygen containing atmosphere at a temperature of 115° F. for 7 days, for its ability to leaven a sweet dough. The dry yeast was rehydrated in warm water (100° to 110° F.) for these tests. Leavening activity was determined as follows:

The time required for a given weight of the sweet dough, maintained at 86° F., to rise to a predetermined volume was determined (fermentation time) as well as the time required for the dough to reach this volume at the same temperature after being punched down (proof time).

The same tests were performed on a portion of the same yeast containing no BHA which served as a control. The results are given in the following Table I.

TABLE I.—LEAVENING ACTIVITY

| Additive | Percent H²O in the dry yeast | Initial | | After storage | |
|---|---|---|---|---|---|
| | | Fermentation time | Proof time | Fermentation time | Proof time |
| None | 5.5 | 114 | 87 | 163 | 124 |
| 0.1% BHA | 5.4 | 113 | 88 | 137 | 119 |

EXAMPLE II

This example illustrates the use of BHA with surfactants in the method of the present invention.

20 grams of sorbitan monostearate were suspended in 250 ml. of water and the suspension was heated to a temperature from 140° to 160° F. 125 grams of the suspension were cooled to about 100° F. and added to 4 kgs. of an aqueous yeast suspension containing 23.1 percent yeast solids. This composition was mixed for about one hour, filtered and pressed to yield a press cake containing about 35% solids. 1.68 grams of a solution of BHA in an edible vehicle (1 part by weight of BHA to 7 parts by weight edible vehicle) was sprayed onto 600 grams the press cake while it was being mixed in a Kitchen Aid mixer for 15 minutes. The yeast was extruded, dried and tested for leavening activity in the manner described in Example I.

Another dry yeast product was prepared in the same manner using sorbitan tristearate as the surfactant instead of sorbitan monostearate. The results for leavening tests are given in the following table:

TABLE II

| Additive | Moisture, percent | Initial leavening activity | | Leavening activity after storage[1] | |
|---|---|---|---|---|---|
| | | Fermentation time | Proof time | Fermentation time | Proof time |
| None (control) | 4.8 | 156 | 126 | 194 | 156 |
| 1% sorbitan monostearate plus— | | | | | |
| 0.1% BHA in peanut oil | 4.5 | 100 | 86 | 123 | 123 |
| 0.1% BHA in corn oil | 4.5 | 98 | 81 | 128 | 124 |
| 0.1% BHA in propylene glycol | 4.4 | 103 | 85 | 131 | 122 |
| 1% sorbitan tristearate plus 0.1% BHA in peanut oil | 4.6 | 107 | 92 | 136 | 129 |

[1] Stored in oxygen containing atmosphere for 7 days at 115° F.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of producing an active dry yeast having a high storage stability which comprises incorporating into a wet yeast cake containing more than 25% yeast solids an antioxidant selected from the group consisting of butylated hydroxyanisole and butylated hydroxytoluene an drying the yeast to a moisture content below about 6 percent.

2. A method of producing an active dry yeast having high storage stability which comprises incorporating into a wet yeast cake containing more than 25% yeast solids an edible vehicle having dissolved therein an antioxidant selected from the group consisting of butylated hydroxyanisole and butylated hydroxytoluene and drying the yeast to a moisture content below about 6 percent.

3. A method as claimed in claim 2, wherein the edible vehicle is a vegetable oil.

4. A method as claimed in claim 2, wherein the amount of antioxidant is between about 0.025 and about 0.5 percent based on the weight of the yeast solids.

5. A method as claimed in claim 4, wherein the amount of antioxidant is between about 0.1 and about 0.2 percent based on the weight of the yeast solids.

6. A method as claimed in claim 3, wherein the amount of edible vehicle is between about 0.25 and about 2.5 percent based on the weight of the yeast solids.

7. A method as claimed in claim 3, wherein the amount of edible vehicle is between about 0.5 and about 1.5 percent based on the weight of the yeast solids.

8. A method of producing an active dry yeast having a high storage stability which comprises incorporating into a wet yeast cake containing more than 25% yeast solids an antioxidant selected from the group consisting of butylated hydroxyanisole and butylated hydroxytoluene and with an edible surfactant and drying the yeast to a moisture level below about 8 percent, the edible surfactant being characterized as having the ability to protect the activity of the yeast during drying.

9. A method as claimed in claim 8, wherein the wet yeast cake is mixed with a surfactant selected from the group consisting of sorbitan monolaurate, sorbitan monopalmitate, sorbitan monostearate, sorbitan tristearate, and sorbitan monooleate.

10. A method as claimed in claim 9, wherein the amount of surfactant is between about 0.25 and about 5 percent based on the weight of the yeast solids.

11. A method as claimed in claim 10, wherein the amount of surfactant is between about 1 and about 2 percent based on the weight of the yeast solids.

12. A method as claimed in claim 9, wherein the antioxidant is dissolved in an edible vehicle prior to the antioxidant being mixed with the wet yeast cake.

13. A method as claimed in claim 12, wherein the edible vehicle is a vegetable oil.

14. A method as claimed in claim 13, wherein the amount of antioxidant mixed with the wet yeast cake is between about 0.025 and about 0.5 percent based on the weight of the yeast solids.

15. A method as claimed in claim 4, wherein the wet yeast cake contains from about 28 to about 38 percent yeast solids.

16. A method as claimed in claim 8, wherein the wet yeast cake contains from about 28 to about 38 percent yeast solids.

References Cited

UNITED STATES PATENTS 3,041,249   6/1962   Chen et al. _____ 195—74

A. LOUIS MONACELL, *Primary Examiner.*

D. M. NAFF, *Assistant Examiner.*

U.S. Cl. X.R.

99—96, 150

UNITED STATES PATENT OFFICE
CERTIFICATE OF CORRECTION

Patent No. 3,448,010                                                                             June 3, 1969

Seymour Pomper et al.

It is certified that error appears in the above identified patent and that said Letters Patent are hereby corrected as shown below:

Column 1, line 54, "maaintain" should read -- maintain --. Column 2, line 27, "seat" should read -- yeast --; line 32, "sufactant" should read -- surfactant --; line 63, "the same temperature after being punched down (proof" should read -- moisture. The product was evaluated in the fresh state as --. Column 4, line 25, "sorbitant" should read -- sorbitan --.

Signed and sealed this 21st day of April 1970.

(SEAL)
Attest:

Edward M. Fletcher, Jr.                            WILLIAM E. SCHUYLER, JR.
Attesting Officer                                           Commissioner of Patents